US012098823B2

(12) United States Patent
Hochheim et al.

(10) Patent No.: US 12,098,823 B2
(45) Date of Patent: Sep. 24, 2024

(54) LIGHT WEIGHT LED LIGHTING PANEL

(71) Applicant: CHAUVET & SONS, LLC, Davie, FL (US)

(72) Inventors: Frieder Hochheim, Los Angeles, CA (US); Mark Primrose, Valencia, CA (US); Jim Bogdanowicz, Thousand Oaks, CA (US)

(73) Assignee: CHAUVET & SONS, LLC, Davie, FL (US)

(*) Notice: Subject to any disclaimer, the term of this patent is extended or adjusted under 35 U.S.C. 154(b) by 0 days.

(21) Appl. No.: 18/327,578

(22) Filed: Jun. 1, 2023

(65) Prior Publication Data

US 2023/0400170 A1 Dec. 14, 2023

Related U.S. Application Data

(60) Provisional application No. 63/366,027, filed on Jun. 8, 2022.

(51) Int. Cl.
*F21V 19/00* (2006.01)
*F21S 4/28* (2016.01)
*F21V 23/00* (2015.01)
*F21V 23/06* (2006.01)
*F21Y 105/10* (2016.01)
*F21Y 115/10* (2016.01)

(52) U.S. Cl.
CPC .............. *F21V 19/003* (2013.01); *F21S 4/28* (2016.01); *F21V 23/001* (2013.01); *F21V 23/06* (2013.01); *F21Y 2105/10* (2016.08); *F21Y 2115/10* (2016.08)

(58) Field of Classification Search
CPC ...... F21V 19/003; F21V 23/001; F21V 23/06; F21S 4/28; F21Y 2105/10; F21Y 2115/10
See application file for complete search history.

(56) References Cited

U.S. PATENT DOCUMENTS

2008/0037287 A1 2/2008 Krohn
2017/0248289 A1* 8/2017 Vasylyev ................ F21V 13/02
2018/0038578 A1 2/2018 Son

FOREIGN PATENT DOCUMENTS

DE 102010005454 A1 7/2010

OTHER PUBLICATIONS

European Search Report and Search Opinion received for EP Application No. 23177803.6, mailed on Oct. 19, 2023, 8 pages.

* cited by examiner

*Primary Examiner* — Mary Ellen Bowman
(74) *Attorney, Agent, or Firm* — WOMBLE BOND DICKINSON (US) LLP

(57) ABSTRACT

An LED light fixture having a rectangular or other geometric shape plastic or other rigid material panel with at least one row of flutes. Each flute has an equally sized cross-section, forming a channel extending a length of the rigid panel. A plurality of LED strips are configured to be inserted into a corresponding one of the channels. The LED strips have a common edge at one end forming electrical connections to individual LEDs on each strip. The common edge may be contained within an enclosure. A frame surrounds the rigid panel and the enclosure. The fixture may include one or more additional pluralities of LED strips received by additional channels of the rigid panel.

22 Claims, 4 Drawing Sheets

LIGHT WEIGHT LED LIGHTING PANEL

BACKGROUND OF THE INVENTION

The motion picture industry relies heavily on large surface, soft light, high output lighting fixtures. High light output fixtures tend to be heavy as they are made up of the combined weight of light emitting diode (LED) fixtures, heatsinks to cool the panels, fans, drive and control electronics and fixture yokes for mounting the lighting fixture to a lighting grid or lighting stand. The weight of the fixtures restricts their usage in terms of rigging above actors on location which does not have the benefit of a lighting grid as is found in a film or TV studio.

In response to this weight drawback, a new class of LED light fixtures have entered the market. These LED light fixtures include flexible circuit boards that can be rolled or curved. The fixture construction usually consists of various layers of plastic and cloth backed material stitched together with Velcro® fastening material along the periphery to interface with additional lighting control devices, such as a lighting louver. A lighting louver restricts the spread of the light emission from the LEDs and confines the light to a defined beam angle. The electronics are removed from the fixture and operate remotely to power and control the fixture. All of this enables a lighter weight fixture that can be offered in various sizes.

The challenge for manufacturers using these flexible circuit boards is maintaining the longevity and reliability of the panel. Since the panels are flexible, the occurrence of solder failures between the LED terminals and the flexible circuitry, results in LED failures. Since LEDs are usually circuited in groupings or strings, when one LED has a failed solder point, a string of LEDs will fail to illuminate. The construction of these panels utilizing various layers of laminated plastics and cloth make repairs to the solder point very challenging. The wiring of the panel during initial production and repairs is also labor intensive as the wires must be strain relieved and sewn into the panel structure.

Another technique for building a lightweight LED light fixtures is to use a lightweight flexible circuit board populated with LEDs and then mount the circuit board to a more rigid but lightweight substrate such as corrugated polypropylene. Kino Flo as early as 1987 utilized 6 mm corrugated polypropylene panels as a lightweight fixture material to which fluorescent lights were clipped forming a grouping of 1, 2 or 4 lamps. Another company, Lite Gear, used the same type of corrugated polypropylene with which they laminated a number of layers to form a stable panel to which they then applied a thin based LED circuit board or platen. This in turn was further covered by a clear plastic material to prevent damage and dust from getting to the LEDs. The outer perimeter was wrapped in a Velcro® material to which other lighting diffusion accessories could be applied.

This reduces the flex of the LED panel while maintaining the lightweight nature of the fixture. By adding a clear plastic barrier, the LEDs are protected from dirt and somewhat protected from direct hits from an object. However, these systems invariably suffer some LED solder failures and are very labor intensive to repair.

Exalux, a French manufacturer, uses similar lightweight materials to form a lightweight panel on top of which a LED platen is laminated along with a protective clear plastic panel for protecting the LEDs from dust and impact. Again, when there are solder failures, the fixture is very expensive to repair. TeddyKorea Co., Ltd., Aladdin and Profound are three Korean manufacturers of lightweight flexible LED panels which are also expensive to repair.

Teddykorea Co., Ltd. filed a US patent application published as US 2018/0038578 A1. The fixtures as disclosed by this application are of lighter construction than Lite Gear and Exalux in that their fixtures utilize several laminated cloth and thin plastic sheets to which a flexible LED panel is laminated. The panel disclosed in this publication shows wired series connections between multiple, parallel LED strips. This panel is further protected by a clear or translucent plastic protective cover. The resulting panel maintains a degree of flexibility and is very light weight, but is also expensive to repair since the multiple parallel LED strips are mounted on a single rectangular shaped board. As such, when an LED solder joint fails, there is no easy way to repair the board and its replacement is expensive.

SUMMARY OF THE INVENTION

The present invention addresses the need for a rigid, lightweight LED light panel that is easy to manufacture and repair by providing a new construction design. This new design makes maintenance and repair of the LEDs easier than prior art techniques as access to the LED platen is simplified. What is provided is an LED light fixture formed by a rectangular or other geometric shape plastic or other rigid material panel having at least one row of flutes each having an equally sized cross-section. The flutes each form a channel extending the length of the rigid panel and receive fingers formed as LED strips which are inserted into a corresponding one of the channels. The fingers of LED strips have a common edge at one end which has contacts for an electrical connection so that power can be supplied to each to the LEDs on each strip. An easily removable frame surrounds the rigid panel, wherein one side of the frame covers an enclosure which encloses the common edge and protects the wired connections.

DETAILED DESCRIPTION OF THE INVENTION

Figure 1:
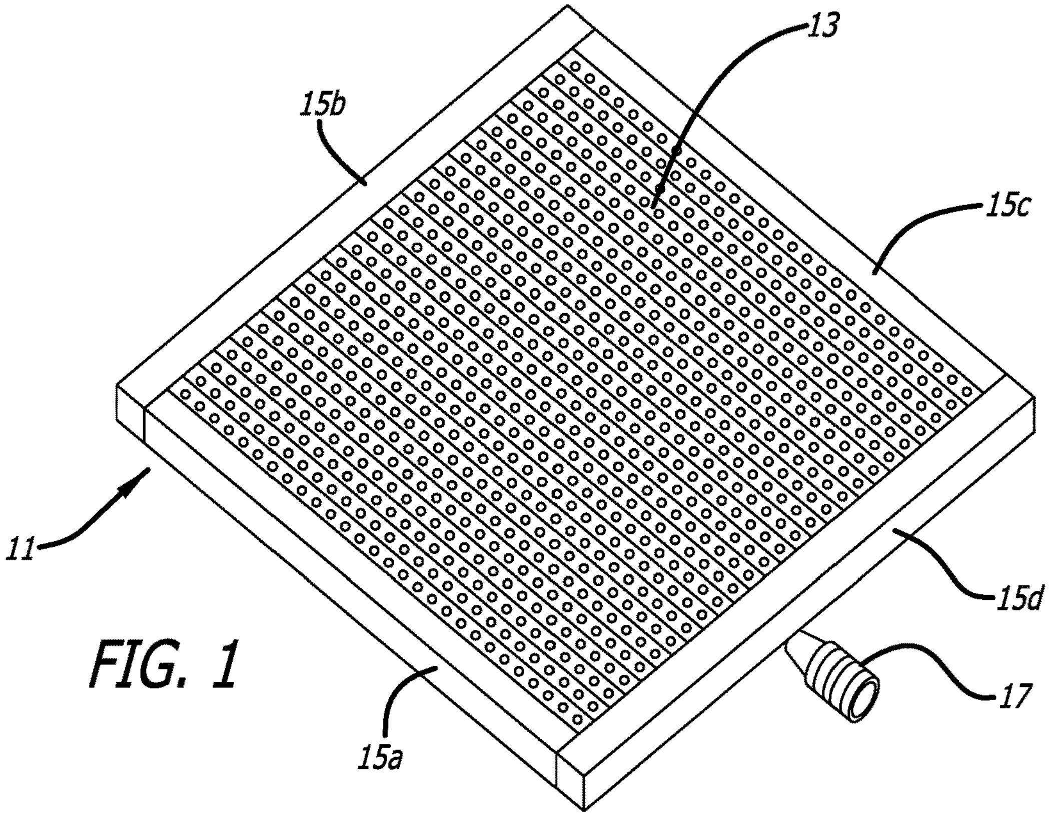
FIG. 1 shows the front surface of the invented LED light panel from which light from LEDs is emitted.

In an embodiment, FIG. 1 shows a front or LED facing side of light fixture 11 which uses a rigid plastic material known as a triple wall polycarbonate clear or translucent panel 13 of the type used for constructing greenhouses or as protective hurricane and storm panels for windows. In one embodiment, the panel thickness consists of two stacked 16 mm×6 mm wide flutes (see FIG. 4) that run the length of the panel. In other embodiments, double wall panels can be used, but this would require another layer since double wall panels are formed in a single row which may limit how the panel can be mounted and used. Another layer could be any sturdy lightweight material since only one row of the two stacked flutes is used to hold LEDs used by the fixture for lighting. The dimensions of the flutes can differ, but flutes having a rectangular cross section and a dimension of 16 mm×6 mm has been found to be preferable for the intended use as specified herein. The fixture 11 and panel 13 may as illustrated have a square or rectangular shape, but the invention includes fixtures and panels which may have any geometric shape.

Preferably, one side of the panel is UV stabilized to prevent discoloration of the plastic material due to UV exposure. Such UV stabilization can be obtained from the manufacturer of panel 13. Instead of applying a lightweight LED platen to the surface over which it would be necessary to laminate another protective plastic coating as is typical in the prior art, the present invention uses the open flutes as channels for holding the LED platen with separate fingers (see FIG. 5), thereby obviating the need for a protective plastic or other coating to protect the LEDs on each finger since the flutes enclosing each finger provide the necessary protection to the LEDs. Since the plastic used to form panel 13 is clear, even though enclosed within the channel, the top of each LED is visible in FIG. 1. If the panel is made from a rigid material other than a clear plastic, the surface would need to be clear or translucent so that light emitted by the LEDs would pass through the surface.

The panel is framed by top and side caps 15*a*, 15*b* and 15*c*. A bottom cap 15*d* completes the frame around the panel. Although the top and side caps may be removable, normally the top and side caps maintain their connection to the panel. However, bottom cap 15*d* is removable to provide access to the LED platens as explained below A connector 17 for electrical wires extends from bottom cap 15*d*.

Figure 2:
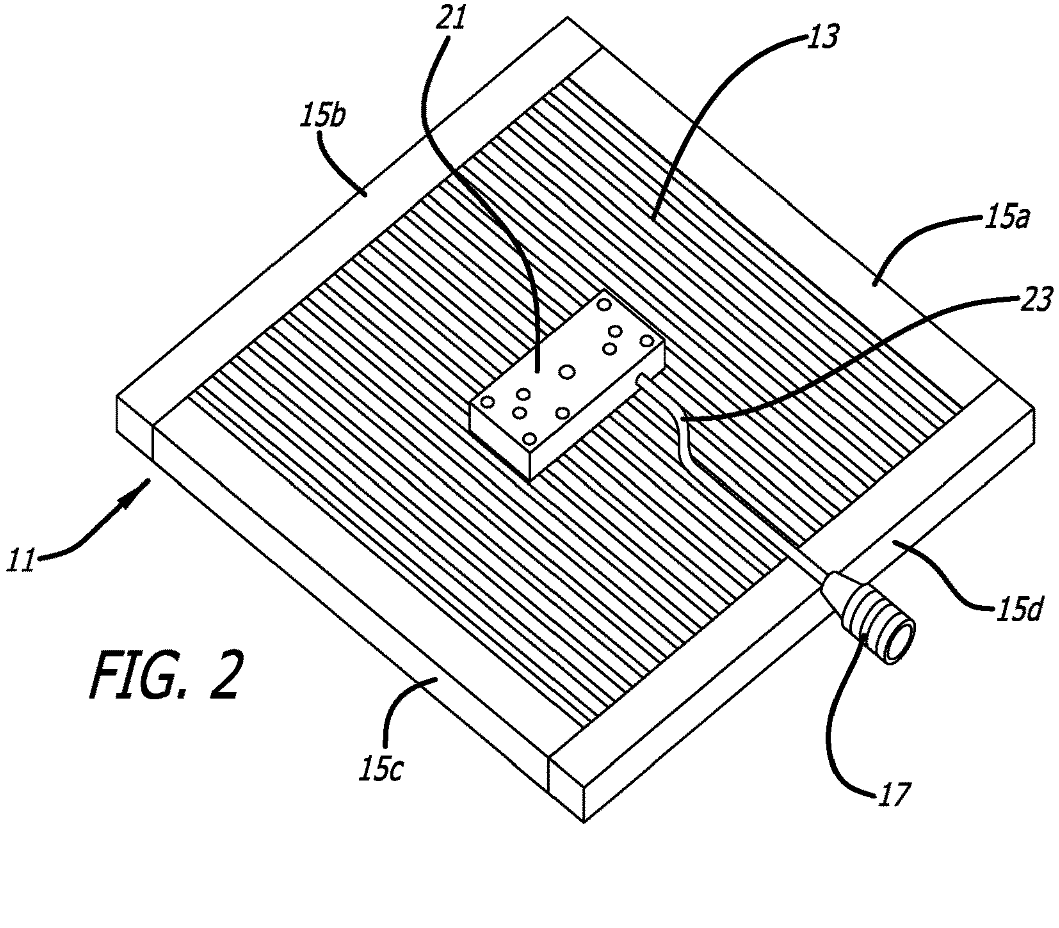
FIG. 2 shows the back surface of the invented LED light panel with a mounting plate assembly shown attached to the back surface with an attached cable and connector.

FIG. 2 shows a back side of fixture 11 and panel 13 along with a mounting plate assembly 21 connected to the back side from which a cable 23 extends terminating at connector 17. The back side of panel 13 even though it may be made of the same clear plastic as the front side shown in FIG. 1, since the LEDs are installed on a board and face the front side of the panel, individual LEDs cannot be seen in FIG. 2. Although not shown in FIG. 2, mounting plate assembly 21 covers the opposite end of cable 23 which includes a connector for receiving wires as explained with reference to FIG. 3A. A control cable (not shown) is connected to connector 17 to provide power to the LEDs as is well known in the art.

Figure 3A:
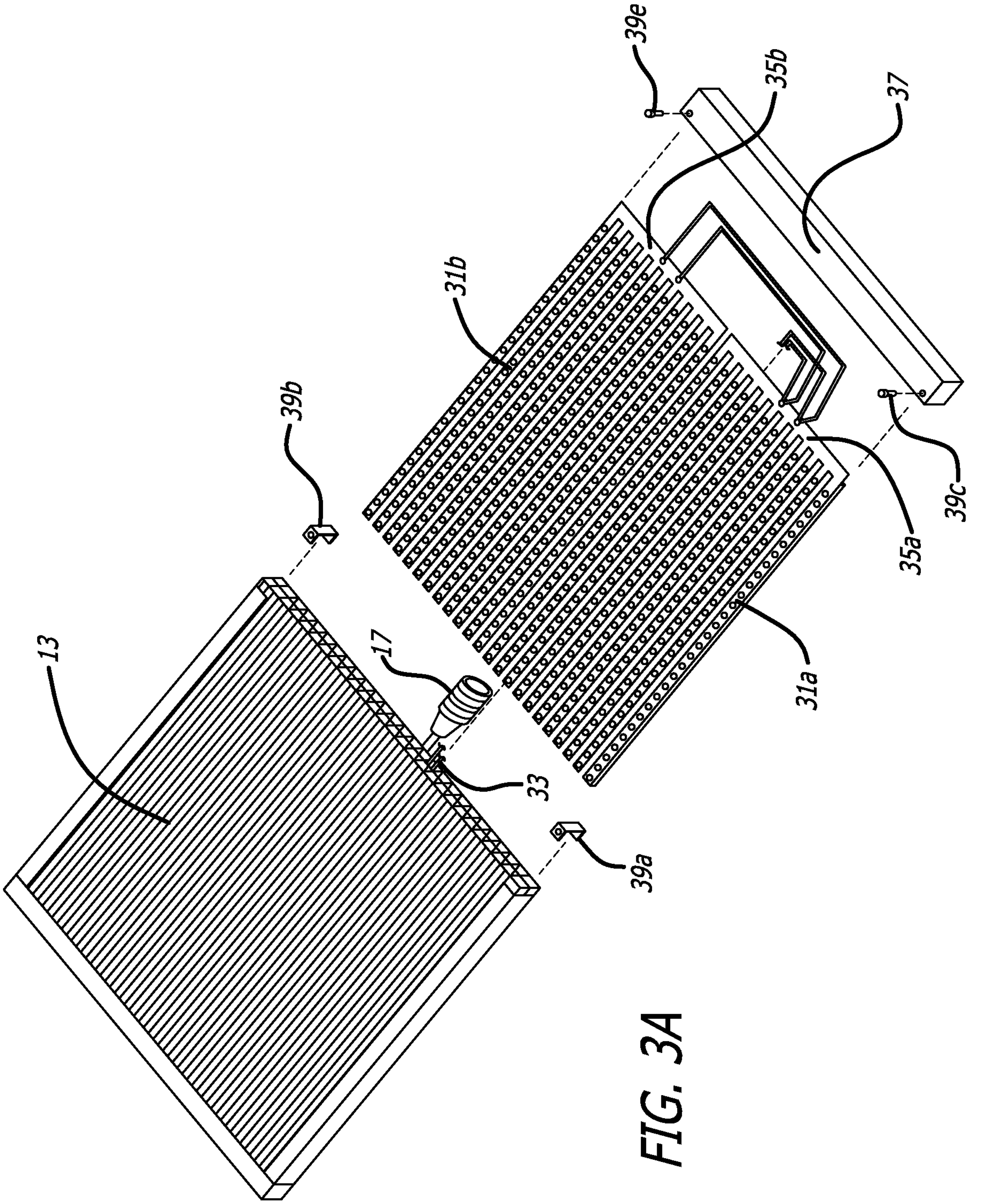
FIG. 3A is an exploded view of the invented LED light panel with a pair of LED platens and wiring.
Figure 3B:
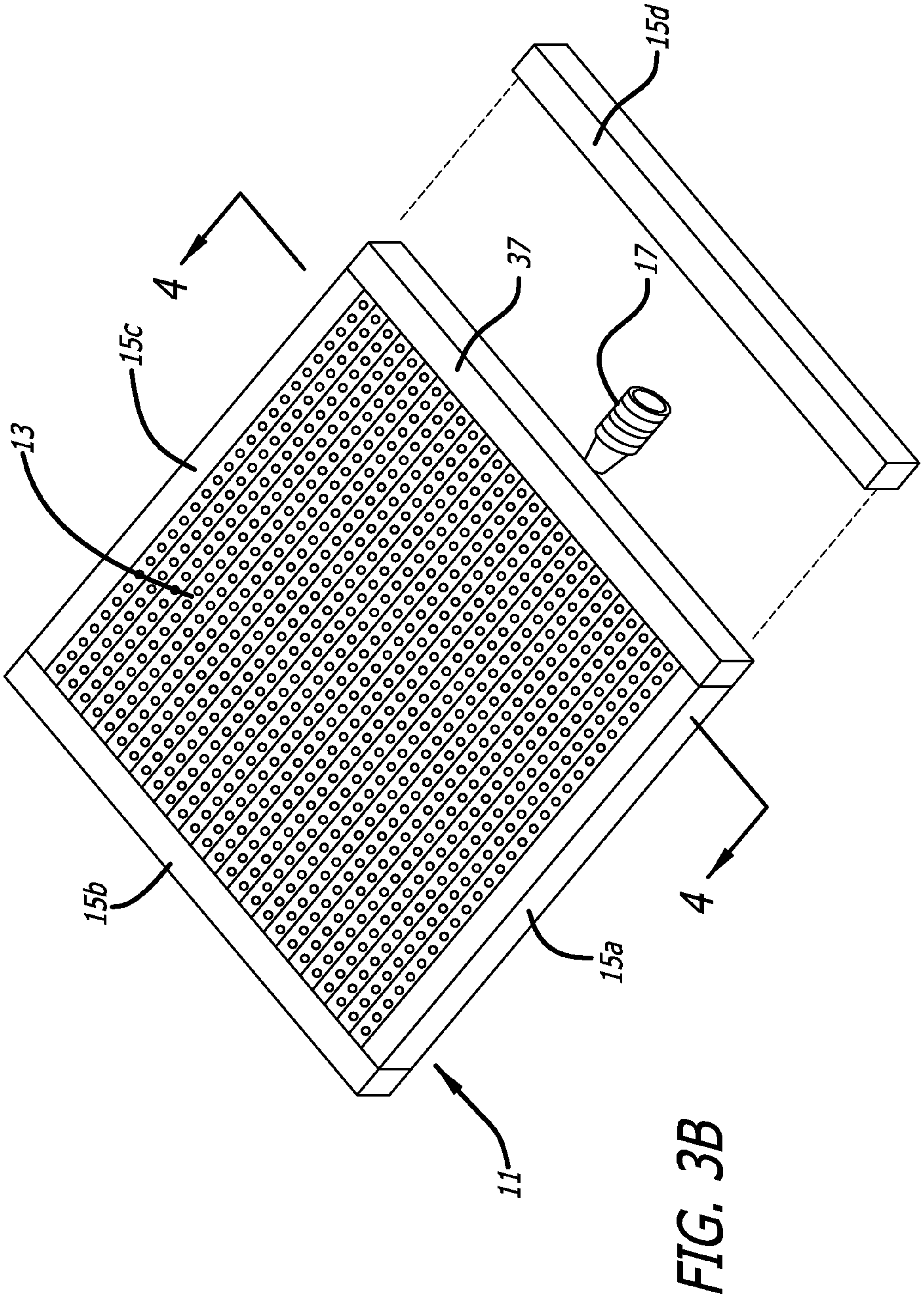
FIG. 3B is an exploded view of the invented LED light panel prior to its final assembly.

Referring now to FIGS. 3A and 3B, LED platens 31*a* and 31*b* are shown separated from panel 13. The substrate of each platen is formed by an industry standard printed circuit board (PCB) or similar substrate. Each platen contains columns of separate LEDs mounted on the PCB substrate which are electrically connected to each other and create light when electrical power is supplied. Although the structure of the platens is unique, the mounting of the LEDs on each column and how they are connected to each other is well known in the art.

Wires 33 which extend from panel 13 are connected via a connector (not shown) within mounting plate assembly 21 to cable 23 as described with reference to FIG. 2. In this connection, the details of the connections between cable 23, the connector covered by mounting plate assembly 21 and wires 33 are not important to an understanding of the invention as these wires and connectors simply carry an electrical current to the LED platens 31*a* and 31*b*.

Figure 5:
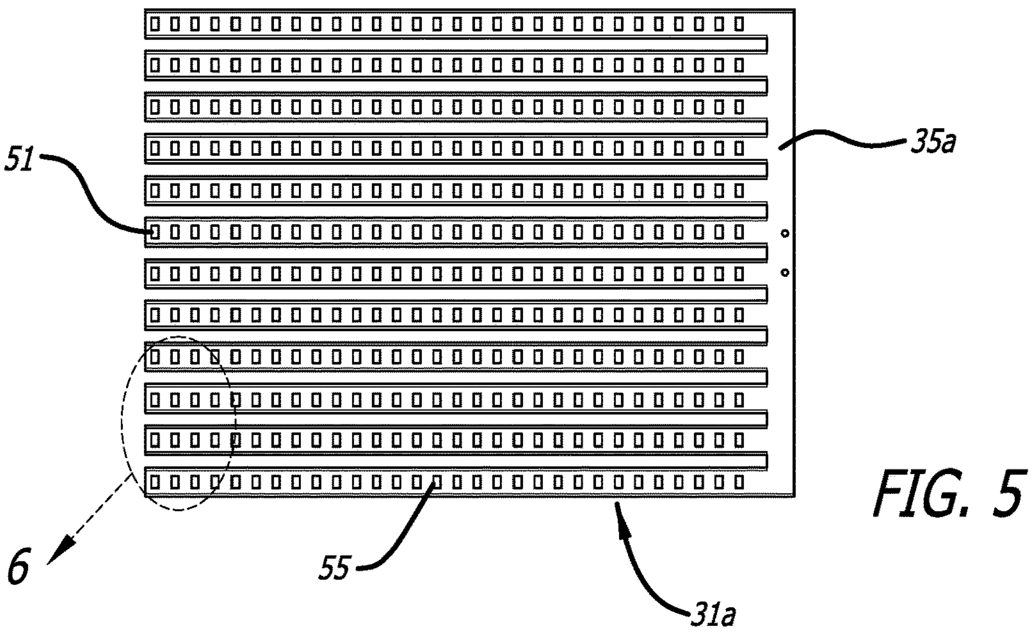
FIG. 5 is shows one side of an LED platen with twelve columns of LEDs.
Figure 6:
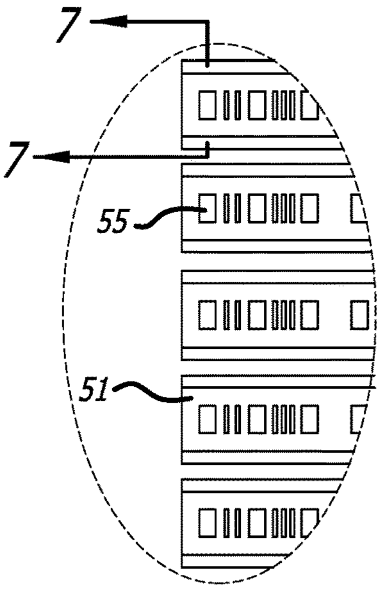
FIG. 6 is an exploded view of a portion of FIG. 5 taken along oval 6.

Each LED platen is constructed in a manner that allows the circuiting of the LED channels or flute strips along a common edge 35*a* and 35*b* resulting in a panel that resembles a multipronged fork as best seen in FIG. 5 and detailed in FIG. 6. An enclosure 37 secures the LED platens with brackets and screws 39*a*, 39*b*, 39*c* and 39*d*. The brackets can act as rigging points when it is desired to suspend the fixture so that it has a horizontal orientation, The invention eliminates the traditional wiring of strips in favor of a single circuit board with multiple fingers forming the multipronged fork which in combination form each LED platen. An electrical connection of wires 33 is made to common edge 35*a*. These wires are then extended to common edge 35*b*. Common edge 35*a* and 35*b* are at one end of each platen as shown in FIG. 3B. These connections are encased in enclosure 37 to protect the circuit connections. Although the drawings show two LED platens, each with six columns or fingers, there could be one platen with fewer or more than six columns or more than two such platens. So long as there are enough flutes which form the panel to correspond to the number of columns on the platen or platens, the specific number of platens and columns is determined based on the specifics of the intended use of the fixture 11.

LED platens 31*a* and 31*b* are inserted into flutes 41 (see FIG. 4) of panel 13 so that edges 35*a* and 35*b* are flush with the end of the panel so that enclosure 37 and can be connected to the panel with brackets and screws. The completed assembly of the panel 13 and enclosure 37 is shown in FIG. 3B. End cap 15*d* fits over enclosure 37 forming the completed fixture 11 shown in FIGS. 1 and 2. In this manner, although the panel provides structural strength while being light in weight, in the event of failure of an LED or an entire platen, by removing end cap 15*d* and enclosure 37, wires 33 connected to edge 35*a* or 35*b* can be disconnected. For platen 35*a*, the connector covered by mounting plate assembly is also disconnected from wires 33. In this manner, although the invented construction will prevent solder failures since the solder joints are fully protected and the platens are not flexed, in the event of failure, one or both platens can be easily removed and replaced relatively quickly and inexpensively.

Figure 4:
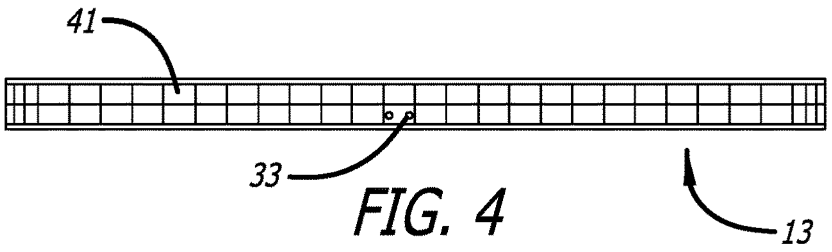
FIG. 4 is a detailed view taken along line 4-4 of FIG. 3B showing one end of the LED light panel with its open flutes before installation of an LED platen into the open flutes.

FIG. 4 shows a bottom edge of panel 13 which more clearly shows each individual flute 41. FIG. 5 shows the individual fingers 51 forming platen 31*a*. As shown in FIG. 5, each finger 51 has mounted thereon a row of LEDs 55. The number of LEDs on each finger depends on the specific intended use of the light fixture. The LEDs can all be a single color or multiple colored LEDs can be used in which case an additional wire 33 would be needed for each different color LED. The specifics of how the individual LEDs are connected on the substrate used to form the platen is not critical to an understanding of the invention and is well known to persons skilled in the art. Additionally, one or more of the individual fingers may not be fully populated with LEDs, or have no LEDs.

Mounting plate assembly 21 is raised above the back of the panel allowing a cavity to be incorporated underneath it within which the panel circuitry is connected to cable 23. In an embodiment, cable 23 is strain relieved to the mounting plate assembly. In an embodiment, the mounting plate assembly also includes a fixture strain relief ring (not shown) required to provide a safety tie-off point when rigging above actors or other subject to prevent injury in the event of a rigging hardware failure resulting in the fixture falling. The mounting plate assembly can incorporate a rubber seal to precent moisture or water intrusion underneath or through the mounting plate assembly. This prevents moisture intrusion into the flutes holding the LED plate strips.

Figure 7:
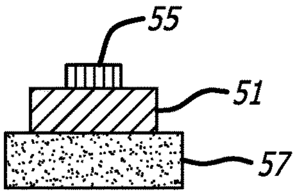
FIG. 7 is a detailed view taken along line 7-7 of FIG. 6 showing a single finger of the LED platen with an LED on top and spacer on the bottom.

Preferably, the back side of the LED fingers are applied with a foam plastic or similar material spacer 57 as shown in FIG. 7 to ensure a snug fit for each of the LED fingers into a corresponding flute. The spacer acts as an alignment feature for the LEDs aligning them to the center of each flute as well as ensuring the LED strips do not rattle when in use.

In an embodiment, outer edges of the plastic panel 13 are wrapped in a material (not shown) to form a watertight seal along the open edges of the panel as well as serving the secondary purpose of providing an adhesion surface for light control accessories such as light control louvers and soft diffusion panels. In an embodiment, a Velcro® type material is used.

In an embodiment, grommet eyelets (not shown) are secured at the 4 corners of the panel in addition to the midway point of two opposing sides. These through-hole grommets allow for cable fastening points utilized in rigging the panels in certain configurations.

The back wall of the fixture is preferably covered with a thin opaque vinyl laminate or similar material (not shown). Alternatively, the back of the panel can be painted black to prevent light from exiting the back of the panel. The back of the panel could also be painted with a black scratch resistant finish.

Each LED platen can be viewed as a building block to make larger panels.

The foregoing descriptions of specific embodiments and devices is used to illustrate the invention and how it may be implemented, but such embodiments and devices are not intended to limit the scope of the invention as defined by the following claims.

We claim:

1. An LED light fixture comprising:

a rigid panel having at least one row of flutes, each flute having a cross-section forming a channel extending a length of the rigid panel;

a plurality of LED strips removably inserted into a corresponding one of said channels, said LED strips being oriented to emit light in a direction of a surface of said panel, said surface configured to allow said emitted light to pass through said surface, said LED strips having a common edge at one end forming electrical connections to individual LEDs on each said strip;

a frame surrounding said rigid panel.

2. The LED light fixture defined by claim 1 further comprising an enclosure enclosing said common edge.

3. The LED light fixture defined by claim 1 wherein said common edge is for connecting to an electrical source for powering said LEDs.

4. The LED light fixture defined by claim 1 wherein said rigid panel is made of plastic and has a second row of said flutes forming a stacked combination of flutes, each of said flutes having an equally sized cross-section.

5. The LED light fixture defined by claim 1 wherein attached to a rear side of said rigid panel opposite a front side from which light is emitted by said LEDs is a second panel which mates with said rigid panel side forming a cavity between said rear side and said second panel.

6. The LED light fixture defined by claim 1 wherein a back side of each said LED strips includes a spacer to align a corresponding LED strip within a center of a corresponding flute.

7. The LED light fixture defined by claim 1 further comprising an opaque material applied to a back of said rigid panel.

8. The LED light fixture defined by claim 1 further comprising a mounting plate assembly removably attached to a back of said rigid panel.

9. The LED light fixture defined by claim 4 further comprising a mounting plate assembly removably attached to a back of said stacked combination of flutes.

10. The LED light fixture defined by claim 5 further comprising a mounting plate assembly removably attached to a back of said second panel.

11. The LED light fixture defined by claim 8 wherein a set of electrical wires extend from said common edge to said mounting plate assembly.

12. The LED light fixture defined by claim 9 wherein a set of electrical wires extend from said common edge to said mounting plate assembly through one of said stacked combination of flutes.

13. The LED light fixture defined by claim 10 wherein a set of electrical wires extend from said common edge to said mounting plate assembly through said cavity.

14. The LED light fixture defined by claim 11 further comprising a cable extending at one end through said mounting plate assembly electrically connected to said set of electrical wires, said cable terminating at second end of said cable with a connector.

15. The LED light fixture defined by claim 12 further comprising a cable extending at one end through said mounting plate assembly electrically connected to said set of electrical wires, said cable terminating at second end of said cable with a connector.

16. The LED light fixture defined by claim 13 further comprising a cable extending at one end through said mounting plate assembly electrically connected to said set of electrical wires, said cable terminating at second end of said cable with a connector.

17. An LED light fixture comprising:

a rigid panel having at least one row of flutes, each flute having a cross-section forming a channel extending a length of the rigid panel;

a first plurality of LED strips removably inserted into a corresponding one of said channels, said LED strips being oriented to emit light in a direction of a surface of said panel, said surface configured to allow said emitted light to pass through said surface said LED strips having a first common edge at one end forming electrical connections to individual LEDs on each of said first plurality of LED strips;

a second plurality of LED strips removably inserted into a corresponding one of said channels, said second plurality of LED strips being oriented to emit light in the direction of the surface of said panel, said second plurality of LED strips having a second common edge at one end forming electrical connections to individual LEDs on each of said second plurality of LED strips;

a frame surrounding said rigid panel.

18. LED light fixture defined by claim 17 further comprising an enclosure enclosing said first common edge and said second common edge.

19. The LED light fixture defined by claim 17 wherein said first common edge and said second common edge are electrically connected and are for connecting to an electrical source for powering said LEDs.

20. The LED light fixture defined by claim 17 wherein said rigid panel has a second row of said flutes forming a stacked combination of flutes.

21. The LED light fixture defined by claim 18 further comprising further comprising a mounting plate assembly removably attached to a back of said rigid panel.

22. The LED light fixture defined by claim 17 wherein said rigid panel is made of plastic and has a second row of said flutes forming a stacked combination of flutes, each of said flutes having an equally sized cross-section.

* * * * *